United States Patent [19]

Snyder et al.

[11] Patent Number: 5,363,119
[45] Date of Patent: Nov. 8, 1994

[54] SCALING PROCESSOR FOR RASTER IMAGES

[75] Inventors: Douglas E. Snyder, Sunnyvale; Samuel Lee, San Jose, both of Calif.

[73] Assignee: Atari Games Corporation, Milpitas, Calif.

[21] Appl. No.: 6,170

[22] Filed: Jan. 15, 1993

Related U.S. Application Data

[63] Continuation of Ser. No. 694,139, May 1, 1991, abandoned.

[51] Int. Cl.⁵ ............................................. G09G 1/06
[52] U.S. Cl. ..................................... 345/131; 345/185
[58] Field of Search ............... 340/731, 723, 799, 798; 395/102, 112; 382/47, 56; 345/131, 127, 185, 202, 112; 273/85 G

[56] References Cited

U.S. PATENT DOCUMENTS

| | | |
|---|---|---|
| 4,283,765 | 8/1981 | Reiger . |
| 4,580,782 | 4/1986 | Ochi . |
| 4,754,270 | 6/1988 | Murauchi . |
| 4,790,028 | 12/1988 | Ramage . |
| 4,829,295 | 5/1989 | Hiroyuki . |
| 4,831,557 | 5/1989 | Murata . |
| 4,834,374 | 5/1989 | Nakamura et al. . |
| 4,857,905 | 8/1989 | Ogawa . |
| 4,872,064 | 10/1989 | Tutt et al. ............................. 382/47 |
| 4,875,173 | 10/1989 | Nakajima ............................. 382/47 |
| 4,885,786 | 12/1989 | Anderson et al. .................. 340/731 |
| 4,907,284 | 3/1990 | Ohuchi ................................. 382/47 |
| 4,926,266 | 5/1990 | Kurosawa ......................... 358/261.1 |
| 4,958,835 | 9/1990 | Tashiro et al. . |
| 4,991,022 | 2/1991 | Canfield et al. .................... 340/731 |

*Primary Examiner*—Ulysses Weldon
*Assistant Examiner*—Doon Chow
*Attorney, Agent, or Firm*—Knobbe, Martens, Olson & Bear

[57] ABSTRACT

A system and method for scaling raster images. Digital pictures are stored in a run length encoded (RLE) format. Object specifiers include a picture index and a scale factor. A line fill state machine, or blitter, scales a raster scan line asynchronously of raster scan synchronization signals. A bit slice processor controls the operation of the blitter and vertical scaling. The growth or shrink scaling is performed about a pre-selected center of mass. A double buffered frame buffer allows one frame buffer to be read while the other is written.

19 Claims, 6 Drawing Sheets

SCALING PROCESSOR FOR RASTER IMAGES

This application is a continuation of application Ser. No. 07/694,139, filed May 1, 1991, now abandoned.

BACKGROUND OF THE INVENTION

1. Field of the Invention

The present invention relates to image processing and, more particularly, to the selective scaling of objects in raster images.

2. Description of the Prior Art

As is well-known in the image processing technology, a continuous tone image, such as a photograph, may be digitized by a raster scanner to produce a bit-mapped image comprising a number of individual pixels. The raster image may then be stored in a non-volatile memory and subsequently presented to a human on a video display.

A composite raster image may be produced by simultaneously displaying a number of raster objects. Each object in the image is characterized by a prestored digital picture. For example, an arcade game may have a prestored raster image of a race car. Since more than one car is displayed, a number of car objects may refer to the same picture, or image data. It should be recognized that pictures are characterized and displayed as non-motion, or fixed, objects, or as motion objects that can move on the video display. The difference is in the degree of difficulty required to reduce or enlarge an object. For instance, if a motion object is moving away from a user, then the size of the object must be reduced multiple times in real-time.

In some present arcade games, a motion object is prescaled a number of times, and the set of varying scale objects is stored in a large memory. The individual stored objects are then sequentially selected and displayed to produce a visual simulation of the object moving farther away from the viewer. For example, in an arcade game of horseshoes having a set of user controls and a video display, a horseshoe is "thrown" at a metal stake. As the horseshoe (i.e., a motion object) is visually represented as traveling away from the user towards the metal stake in the background, as many as a hundred individually stored objects representing horseshoes of varying sizes are retrieved from a memory and displayed over a period of time to simulate the changing position of the horseshoe. Thus, the game provides the appearance of a shrinking horseshoe as its distance increases from the perspective of the user.

However, these systems using prescaled objects require a costly memory and they are limited in the number of motion objects that can be scaled. Existing computer systems, such as those used for computer-aided design and manufacturing (CAD/CAM), include central processors that, among other tasks, grow and shrink objects in real-time. Nonetheless, the known CAD/CAM systems that provide real-time scaling dedicate sizeable computer resources to the scaling process. The computer resources used in the CAD/CAM systems are impracticable in the context of an arcade game which is further constrained by cost and space. Two recent lower-cost approaches to the real-time scaling of raster objects in arcade games are disclosed in the patents to Nakamura, et al. (U.S. Pat. No. 4,834,374) and Murauchi (U.S. Pat. No. 4,754,270).

The Nakamura, et al., system stores coordinate pixel data for each object in an object image memory. The coordinate pixel data is then vertically and horizontally scaled according to information stored in an object data memory. The vertical scaling is controlled by a line converter which is driven by a line count signal indicating the vertical position of raster scanning on a cathode ray tube (CRT). Horizontal scaling is realized by a rate multiplier that time scales a clock pulse to output a write-in trigger pulse to an address counter which thereby addresses the writing of data into a buffer memory.

The patent to Murauchi discloses a circuit to scale character objects on a raster display. So-called zoom address generators are used to scale vertical and horizontal dimensions. To accomplish the scaling described by Murauchi, the address generators rely on triggering adders during the vertical and horizontal blanking intervals defined in a composite video signal (i.e., the periods when the current to the electron gun is cut-off thereby rendering the retrace on the picture tube invisible).

Nakamura, et al., and Murauchi store each object as a fixed set of pixel coordinate values. Storage of objects in this manner is wasteful of memory space and it would be desirable to encode each object in a compressed format so as to conserve memory. In addition, in these prior art systems, background colors to the right of a picture must be stored which is an inefficient use of a graphics memory. Moreover, these prior art systems rely on the timing of the composite video signal for scaling and, therefore, they are limited in their processing ability. It would be an advantage to accomplish object scaling asynchronously with respect to the timing of the video signal so that more sophisticated processing on objects could be performed. Furthermore, these prior art systems do not scale an object about a reference point without the interaction of a host processor.

Consequently, a need presently exists for a scaling processor for raster images that scales objects in real-time, consumes very little memory by storing only one representation of a compressed object, requires a relatively small expense to manufacture, provides flexible processing that does not depend for timing on a video signal.

SUMMARY OF THE INVENTION

The above-mentioned needs are satisfied by the present invention which includes a scaling processor. The scaling processor contains prestored run length encoded (RLE) pictures and a set of motion object specifiers that are generated in real-time by a microprocessor. The prestored picture data includes a predefined center of mass (or center of scaling) for each picture which is a reference point about which an object is to be scaled. Each of the object specifiers has an index to a predefined picture, a position on the video display for the center of mass, and a scale factor.

The RLE pictures comprise a series of pixel transition segments for each horizontal line of a picture. Each transition segment comprises a transition length, and a transition color code. A line fill state machine, or blitter, is loaded with a transition segment and a scale factor by a bit slice processor. The color code is written into a double buffered video RAM (VRAM) by the blitter until the length of the transition is complete. (In other embodiments, dynamic or static RAM may be organized as a frame or band buffer in lieu of the VRAM.) The length is stored in a length counter that is decremented according to the scale factor. The VRAM is addressed by an XY address counter that is pre-loaded by the bit slice processor and incremented by the blitter.

If the scale factor calls for a shrink operation, a rate multiplier in the blitter selectively disables the incrementing of the XY address counter, writing the same color code into a single location in the VRAM multiple times, i.e., there are fewer unique write addresses during a shrink operation. If the scale factor calls for a growth operation, the rate multiplier selectively disables the length counter, writing the same color code into multiple locations in the VRAM, as the XY address counter is continuously incremented.

The VRAM is double buffered to allow one VRAM to be written while the other is read. The motion object video in the VRAM is read into a multiplexer that combines motion object video with playfield and alphanumeric video data. The color coded data is used to index a color look-up table that assigns relative intensities of red, green and blue to an RGB interface. The composite image is then displayed on a video display.

These and other objects and features of the present invention will become more fully apparent from the following description and appended claims taken in conjunction with the accompanying drawings.

BRIEF DESCRIPTION OF THE DRAWINGS

FIG. 7 is a detailed block diagram of the line fill state machine shown in FIG. 4;

FIG. 8b is a timing diagram of the clock, length counter contents, length counter enable, address counter contents and the address counter enable during the horizontal growth operation as shown by illustration in FIG. 8a;

FIG. 9b is a timing diagram of the clock, length counter contents, length counter enable, address counter contents and the address counter enable during the horizontal shrink operation as shown by illustration in FIG. 9a.

DETAILED DESCRIPTION OF THE PREFERRED EMBODIMENTS

Reference is now made to the drawings wherein like numerals refer to like parts throughout.

Figure 1A:
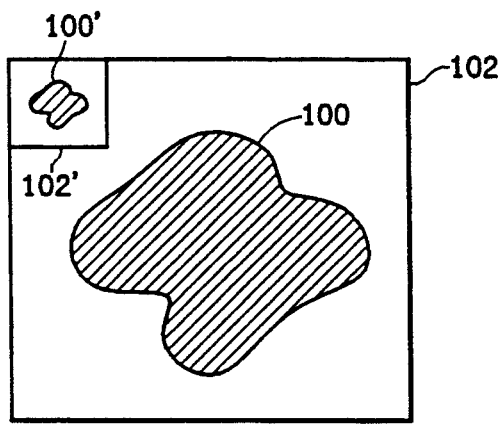
FIG. 1a is a diagram of an object before and after the shrinking operation as performed by a typical scaling device in the prior art.

FIG. 1a illustrates an example of the type of image scaling that is commonly found in the prior art. In FIG. 1a, an object 100 is shown surrounded by a object outline 102 which is generally rectangular in shape. The object 100 is described by a collection of pixels that are different from the background color inside the object outline 102. The object 100 is typically displayed to a human on a video display connected to a computer (none of which are shown). The video display is usually a raster scanning device that is well-known in the field of image processing. As is also well-known, the object 100 may be one of many objects that together form a composite image on the video display. In the present context, the object 100 is a continuous tone image, (such as a photograph of a human), that has been digitized into a collection of pixels by a raster scanner (not shown).

In FIG. 1a, it is assumed that the object 100 has been reduced in scale by a prior art scaling device resulting in a reduced scale object 100', which is shown surrounded by a similarly reduced object outline 102'. As can be seen in FIG. 1a, after scaling, the object 100 has changed its relative position as the reduced scale object 100' is located in the upper left corner of the unscaled object outline 102. Indeed, this shift in relative object position is not the type of scaling that is generally desirable.

Figure 1B:
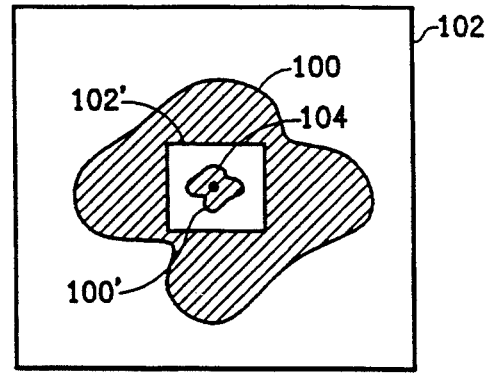
FIG. 1b is a diagram of an object before and after the shrinking operation as performed by the present invention.

In contrast to the prior art scaling technique demonstrated by FIG. 1a, FIG. 1b illustrates the type of image scaling that is performed by the present invention. According to the present invention, a center of mass 104 is pre-specified for the object 100. The scaling is then performed in horizontal and vertical (X,Y) dimensions so as to retain the center of mass 104 at the original prescaled position on the video display. Thus, the unscaled object 100 is shown to underlie the reduced scale object 100' (which is bordered by the reduced scale object outline 102').

Figure 2:
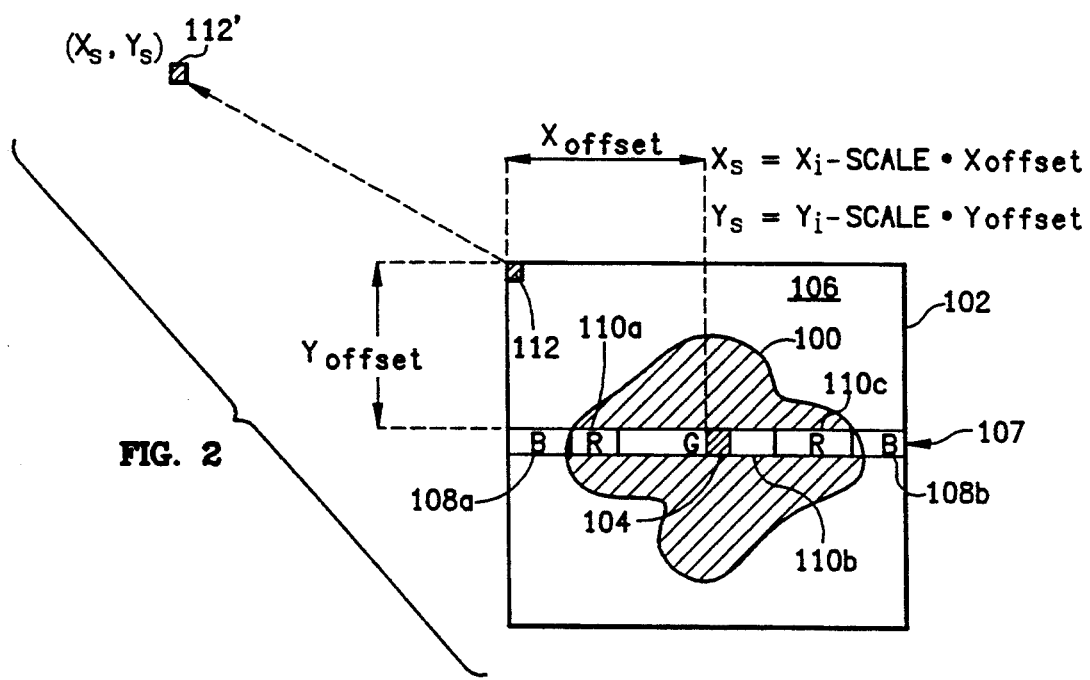
FIG. 2 is a diagram of an object and a pixel from the object having the coordinate transformation applied according to the present invention.

Further details of the results of the present process for scaling an object, in this case enlarging, are shown in FIG. 2. The object 100 is shown surrounded by a background 106 inside the object outline 102. The background 106 is a color (or colors) that is also presented to a human, or user, on the video display. The object 100 can be thought of as lying on top of the background 106 and thus maintains a display priority that is greater than the background 106.

A raster scan line 107 outlines a row of pixels that is bounded on each side by the object outline 102. The height of the raster scan line 107 (and width of each pixel) depends on the resolution of the individual video display but, as an example, is 1/200 of an inch. The pixels defined by the raster scan line 107 are grouped into a pair of background pixel segments 108a and 108b, each being some number of the same neutral color pixels, such as black. Three object transition segments 110a, 110b and 110c, are located within the perimeter of the object 100, and represent groups of pixels having the same color. For instance, the segment 110a represents a group of red pixels, the segment 110b represents a group of green pixels, and the segment 110c represents another group of red pixels. Note that the storing of the pixel segment 108b is not required by the present invention for drawing an object. Therefore, besides the memory gains achieved from encoding, additional graphics memory can be saved.

Now, the center of mass of the object is predefined as an ordered set of offset Cartesian coordinates, ($X_{offset}$, $Y_{offset}$), from the origin at the upper left corner of the object outline 102. An initial position to place the center of mass of the object 100 (on the video display) is provided to the scaling process as coordinates ($X_i$, $Y_i$). Thus, the video display position of the pixel 112 is provided for a pixel 112' in an enlarged object (not shown) by the following equations:

$$X_s = X_i - \text{SCALE} \times X_{offset} \quad (1)$$

$$Y_s = Y_i - \text{SCALE} \times Y_{offset} \quad (2)$$

where:
- $X_s$ is the starting X coordinate to draw the object;
- $Y_s$ is the starting Y coordinate to draw the object;
- $X_i$ is the displayable X coordinate of the object's center of mass;
- $Y_i$ is the displayable Y coordinate of the object's center of mass;
- SCALE is the scaling factor for reduction/enlargement;
- $X_{offset}$ is the horizontal offset of the object origin from the center of mass; and
- $Y_{offset}$ is the vertical offset of the object origin from the center of mass.

Figure 3:
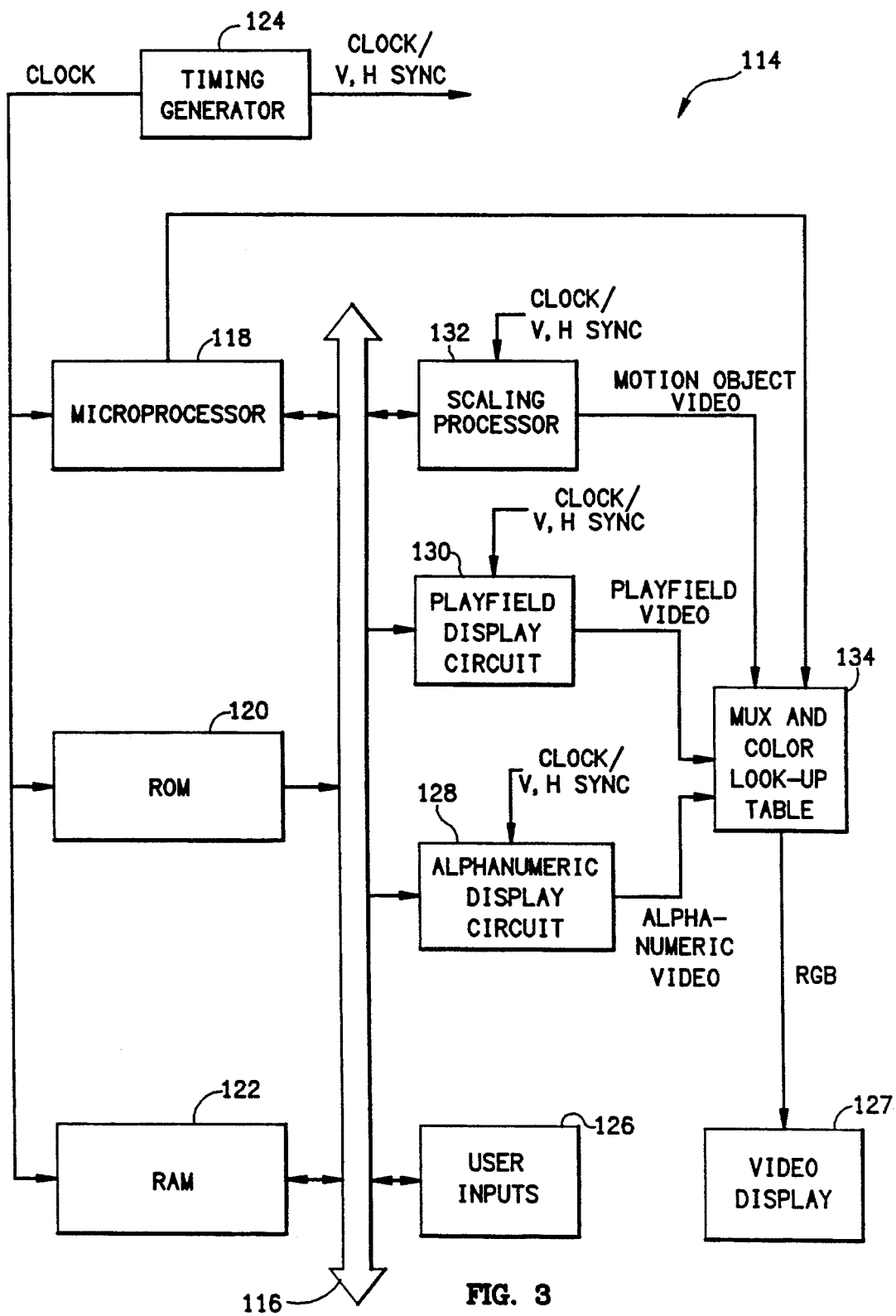
FIG. 3 is a system block diagram of one preferred embodiment of a video arcade game having the scaling processor of the present invention.

FIG. 3 is a system block diagram of an arcade game, or imaging system 114, comprising one preferred embodiment of the present image scaling invention. (One particular arcade game that is represented by FIG. 3 is sold by Atari Game Corporation under the "Pit Fighter" trademark.) In the imaging system 114, a bus 116 provides common data access to various devices and circuits including a microprocessor 118. In the presently preferred embodiment, the bus 116 provides a 16 bit wide path for data. The microprocessor 118, preferably a Motorola 68000 or another member of the 680×0 family of microprocessors, executes a computer program (not shown) that is stored in a read-only memory (ROM) 120 and accessed via the bus 116. As an example of ROM size, one preferred program ROM set consists of 1M×16 bit words of data.

A random access memory (RAM) 122, in one preferred embodiment comprising 32 k×16 bit words, is used for scratchpad memory by the microprocessor 118 (via the bus 116) and for storing parameters for use by other system devices as will be discussed hereinbelow. A timing generator 124 provides a common clock signal to the system components thus described. A set of user inputs 126 are provided by the imaging system 114 for a game player, or user (not shown).

In "Pit Fighter", two players compete against one another in hand-to-hand combat carried out on a video display 127. The video display 127 can be one of any number of RGB monitors including the 336×240 pixel resolution display available from Wells-Gardner of Chicago, Ill. The user inputs 126 include (for each player) a joystick for positioning a raster image of a fighter on the video display 127, and three button switches for, respectively, controlling the fighter to jump, kick and punch. The user inputs 126 are periodically read by the microprocessor 118 and, based thereon, the microprocessor 118 generates video parameters (e.g., position, size, etc.) for an alphanumeric display circuit 128, a playfield display circuit 130 and a scaling processor 132. The circuits 128, 130 and 132 each receive clock, and vertical and horizontal sync signals from the timing generator 124.

The alphanumeric display circuit 128 reads alphanumeric text parameters from the RAM 122 and generates an alphanumeric color code to a video multiplexer and color look-up table circuit 134. For example, information on each player's score is maintained by the microprocessor 118 and the position, size and contents of a score message are processed by the alphanumeric display circuit 128. The resulting alphanumeric video signal is multiplexed with other signals (to be described) and, according to a color number, a specific Red/Green/Blue (RGB) signal is provided to the video display 127. The multiplexer of the circuit 134 is selected, and the color look-up table is loaded, by the microprocessor 118.

The playfield display circuit 130 reads non-motion object parameters from the RAM 122 and generates a playfield video signal to the multiplexer circuit 134. For example, in "Pit Fighter", as the fighters proceed across the video display 127 only the currently viewable portion of the playfield is displayed. That is, the displayed playfield is a two-dimensional image of a portion of a three-dimensional graphical universe containing non-motion objects (e.g., a stadium) in certain predefined positions. Therefore, since the entire universe is not drawn on the video display 127 at one time, portions must be drawn on the video display 127 on a demand basis, e.g., according to where the fighters are located in the universe.

The scaling processor 132, of the present invention, reads motion object parameters from the RAM 122, including such parameters as position of the center of mass, picture index, and scaling factor, for motion objects. The motion objects are scaled and fed to the multiplexer circuit 134 via the motion object color codes. The motion objects are combined with alphanumeric and playfield video signals in the circuit 134 in a well-known way, and then displayed on the video display 127.

Figure 4:
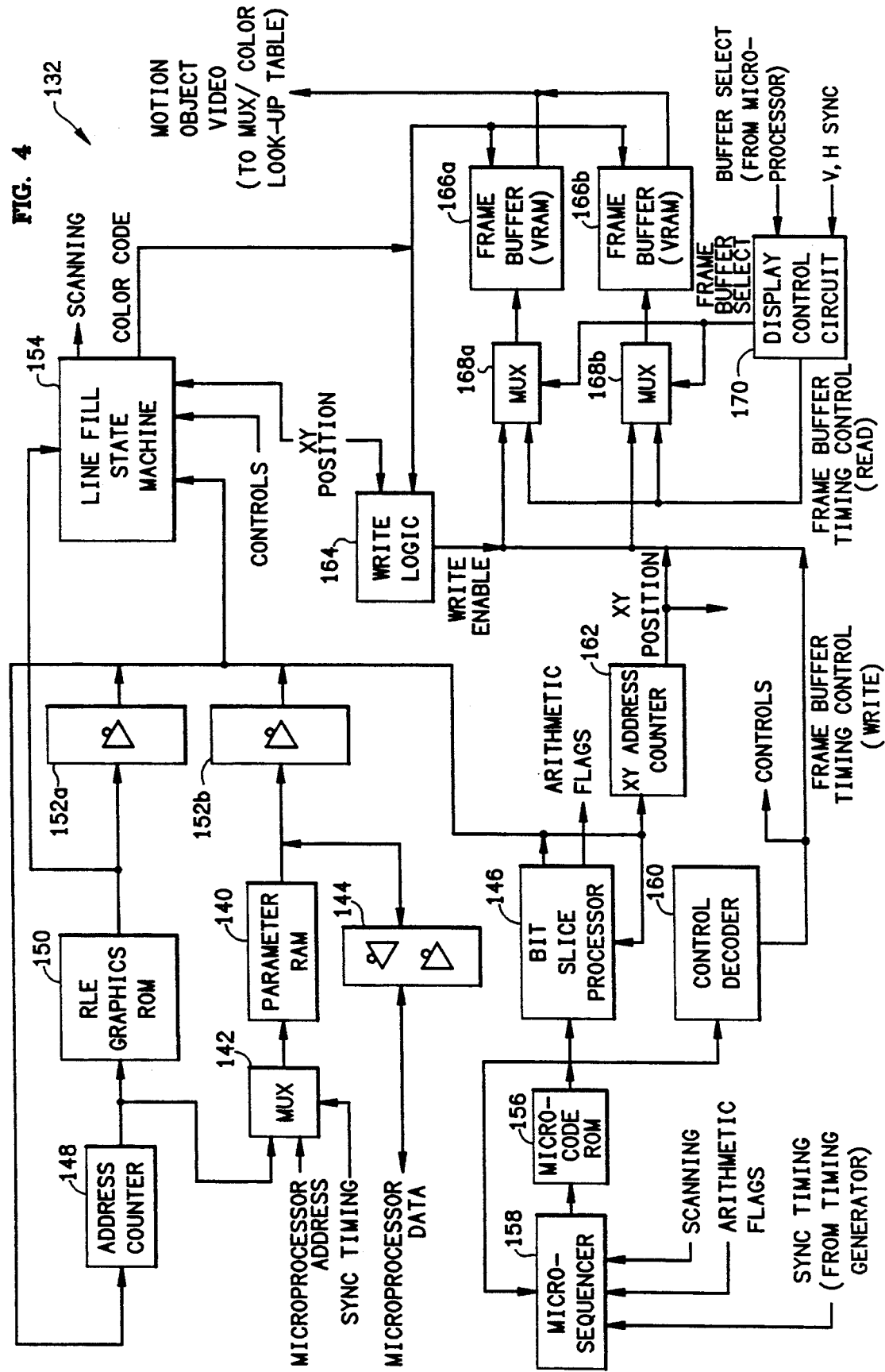
FIG. 4 is a detailed block diagram of the scaling processor shown in FIG. 3.

FIG. 4 is a detailed block diagram of one preferred scaling processor 132 according to the present invention. As was previously mentioned in the discussion of FIG. 3, the parameters of motion objects, (e.g., picture type and orientation, changeable color code, XY position, scaling size, priority, and the like), are calculated by the microprocessor 118 and stored in the RAM 122. The calculation of parameters is based on the user inputs 126 which determine, among other things, a viewpoint into the graphical universe (not shown). The parameter RAM 140 (FIG. 4) is a section of the RAM 122 (FIG. 3). The parameter RAM 140 is loaded by the microprocessor 118 (FIG. 3) across the bus 116 via an address multiplexer 142 and a bidirectional bus buffer 144, as shown in FIG. 4.

The central control of the scaling processor 132 is located in a bit slice processor 146. The bit slice processor 146 is preferably an AMD 29101 semiconductor chip, 16-bit data path, microprocessor that is built by Advanced Micro Devices, Inc. The bit slice processor 146 can also address the parameter RAM 140 by feeding an address to an address counter 148, and having a synchronization timing signal (from the timing generator 124 of FIG. 3) select the multiplexer 142 for use by the bit slice processor 146.

The address counter 148 can also be used by the bit slice processor 146 to address a run length encoded (RLE) graphics ROM 150 which contains a compressed version of the pixel data associated with the raster pictures used in the imaging system 114. (The contents of the RLE graphics ROM 150 will be further discussed below.) The data from the parameter RAM 140 and the RLE graphics ROM 150 is then made available, via a pair of bus drivers 152a and 152b, to a line fill state machine, or "blitter" 154 and the bit slice processor 146. The line fill state machine 154 performs the horizontal scaling of motion objects. Besides controlling the blitter 154, the bit slice processor 146 performs the vertical scaling and horizontal flipping of motion objects.

The bit slice processor 146 executes a microcode program (described below) that is stored in a microcode ROM 156, which is presently preferred to be 512×24 bit words. The next instruction for the processor 146 to execute is fetched from the microcode ROM 156 by a microsequencer 158. The microsequencer 158 is a well-known circuit and one way of implementing the microsequencer is by using off-the-shelf parts, such as three Cypress CY7C907 microprogram sequencers, using well-understood techniques. The microsequencer 158 receives feedback data from the microcode ROM 156, synchronization timing (between the microprocessor 118 and scaling processor 132) from the timing generator 124, arithmetic flags (e.g., carry, zero, etc.) from the bit slice processor 146, and a scanning signal from the line fill state machine 154. The scanning signal is active while a transition segment is being processed by the blitter 154. Based upon these inputs, the microsequencer 158 addresses the next instruction in the microcode ROM 156.

The microcode ROM 156 provides instruction bits to the bit slice processor 146, jump address bits to the microsequencer 158, and control bits to the control decoder 160 which generates control signals to the line fill state machine 154. Note that some of these bit fields overlap. The bit slice processor 146 loads an XY address counter 162 which represents the address in a frame buffer memory corresponding to the X,Y coordinate position of a pixel on the video display 127 (FIG. 3). A portion of the XY position is also fed to the line fill state machine 154 to implement clipping. The line fill state machine 154 outputs a color code corresponding to the pixel at the XY position calculated by the bit slice processor 146. The color code is an index into the color look-up table of the circuit 134 (FIG. 3) wherein varying intensities of red, green and blue are predefined to represent a preselected color. In the presently preferred embodiment, the color code is a variable having a maximum size of six bits, or 64 color codes.

The color code is received by a write logic circuit 164 and two frame buffers, preferably using video RAMs (VRAMs) 166a and 166b. Each VRAM preferably comprises two TMS4461 64k×4 bit video RAMs available from Texas Instruments. The write logic circuit 164, based on the XY position data and the color code, generates a write enable signal to a pair of multiplexers 168a and 168b. The multiplexers 168 are selected, by a display control circuit 170, to output the timing control for the frame buffers 166 from either a write frame buffer timing control signal from the control decoder 160 or a read frame buffer timing control signal from the display control circuit 170. In this way, the frame buffers 166 are used to double buffer the display data which comprises color codes.

For example, based on a buffer select signal generated by the microprocessor 118 (FIG. 3) and vertical and horizontal sync signals received from the timing generator 124 (FIG. 3), the display control circuit 170 selects one of the two frame buffers 166 to be read. The operation of the scaling processor 132 is completely independent of or asynchronous to the raster scan signals that drives the video display 127 (FIG. 3). While the scaling processor 132 is writing motion object color codes into one frame buffer 166 via the XY address counter 162, the write logic 164, the control decode 160 and the color code from the line fill state machine 154, motion object color codes are read from the other frame buffer 166 to the multiplexer and color look-up table circuit 134 through the frame buffer read timing from the display control circuit. The rate of swapping the frame buffers 166 is called the video frame rate which is controlled by the microprocessor 118 (FIG. 3).

Figure 5:
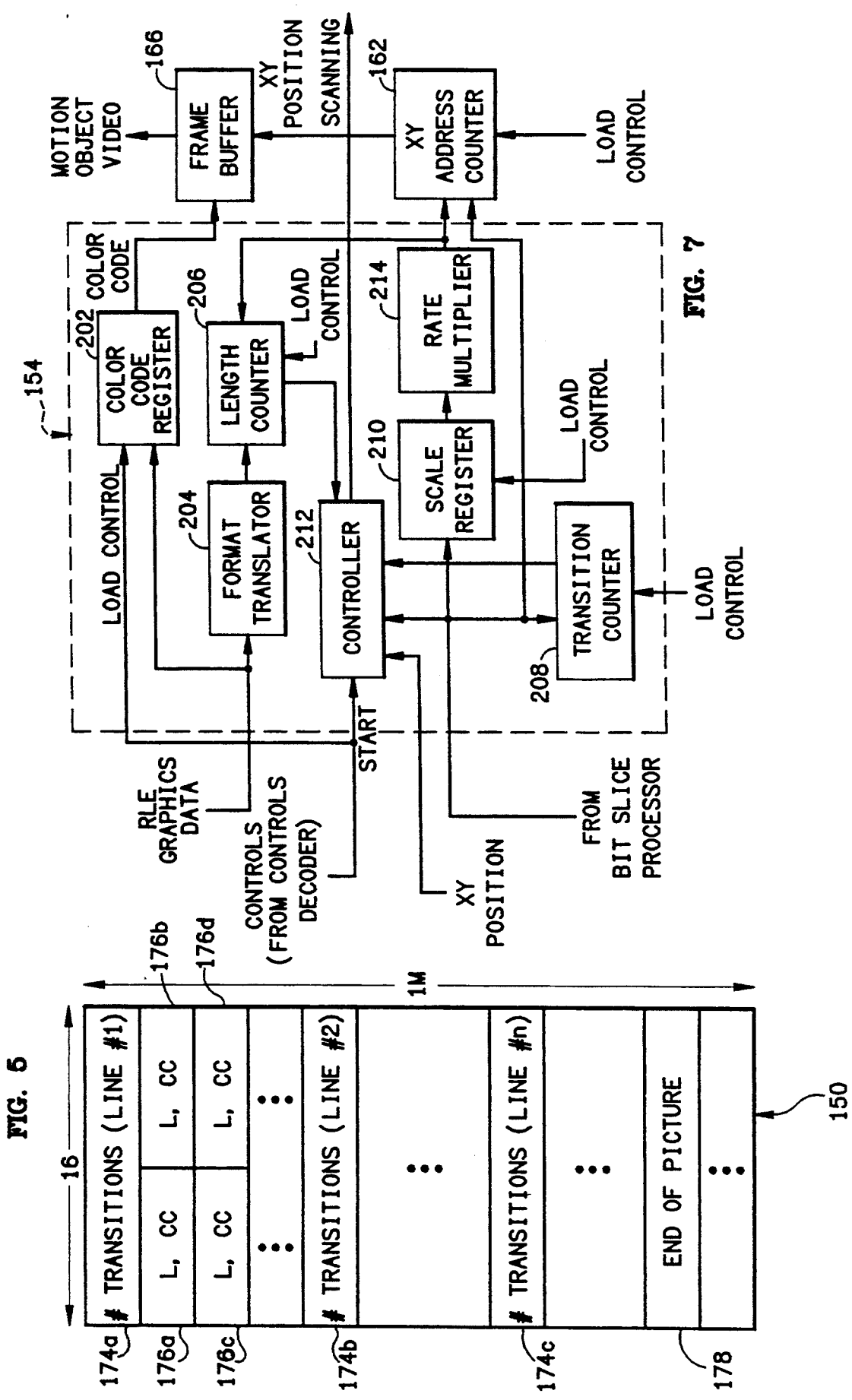
FIG. 5 is a portion of the graphics data representation from the run length encoded (RLE) graphics read-only memory (ROM) shown in FIG. 4.

FIG. 5 is a memory map, or graphics data representation, of the run length encoded picture graphics data portion of one preferred RLE graphics ROM 150. Although not shown, the ROM 150 also contains picture header information, for each picture, describing the location of picture data, the picture data format (e.g., relative sizes of length and color code fields) and the offsets from the upper left corner of the picture to the center of mass. Each horizontal line of picture pixel color data is preceded by a transition offset field 174a, 174b and 174c. The transition offset field 174 contains the number of RLE transition segments there are in the horizontal line.

For instance, referring to the object 100 in FIG. 2, the raster scan line 107 is shown to contain four transition segments 110a,b,c of red, green and red and 108a of a background color. (In the example, it is assumed the object 100 is an unscaled version of a "picture" as defined hereinabove.) Each transition segment 108a and 110 is then defined in an 8-bit half--word as indicated in FIG. 5 by a set of RLE transition segments 176a, 176b, 176c and 176d. Using the object 100 of FIG. 3 as the example picture, there are four transitions 174 in the raster scan line 107, and the RLE definition of the transition segment 110a would be stored in segment 176a as a length (in pixels) and a red color code (e.g., the address in the look-up table 134 of FIG. 3 corresponding to full intensity red, no green, and no blue).

Picture header information includes the format of the RLE transition segments 176. The format may be, as one example: length of segment—up to 16 pixels; color code—one of 16 preselected colors. That is, 4 bits for each portion of the run length encoded data. The picture definition is terminated by an end of picture field 178, which is usually followed by another picture.

Figure 6:
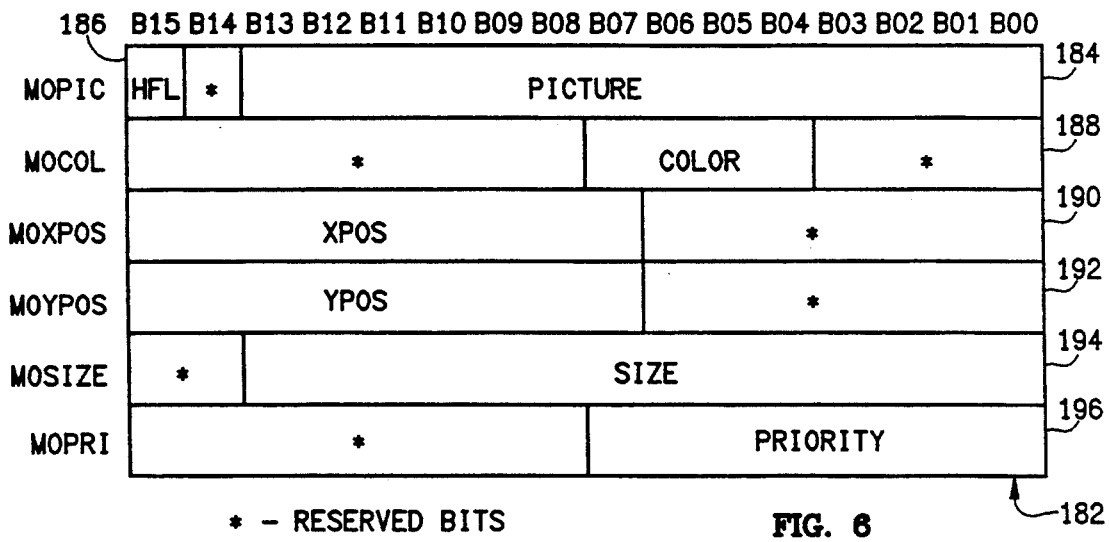
FIG. 6 is a data description of an object specifier stored in the parameter random access memory (RAM) shown in FIG. 4.

FIG. 6 is a diagram showing the memory locations of a presently preferred motion object specifier 182 that is stored in the parameter RAM 140 of FIG. 3. The preferred motion object specifier 182 comprises six 16-bit words. The bits are labeled from the least significant bit B00 (bit 0) to the most significant bit B15 (bit 15). As previously discussed, the motion object specifier 182 is calculated by the microprocessor 118 (FIG. 3), stored in the RAM 122 and later moved to the parameter RAM 140 (FIG. 4). The motion object specifier 182 thus defines the parameters associated with the display of one scaled motion object on the video display 127 (FIG. 3).

The parameters of the motion object specifier 182 begin with an index of a motion object picture (MOPIC) 184. The index 184 is the index, from 0 to 16,383, of the picture header information (not shown) located in the RLE graphics ROM 150 (FIG. 4). For example, a picture index of 1 may refer to the RLE raster image of a first boxer (via the picture header information), a picture index of 2 may refer to the RLE raster image of a second boxer, and so on. The MOPIC word 184 also includes a horizontal flip (HFL) bit 186 that directs the bit slice processor 146 to flip the picture in the horizontal dimension, i.e., write the transition segments for each raster scan line in a reverse order, around the precalculated center of mass.

The next word in the motion object specifier 182 is a 4-bit motion object color field (MOCOL) 188. Presently, the motion color 188 is concatenated with the color code stored in the RLE graphics ROM 150 so that up to 16 banks of color look up table can be addressed simultaneously. A 9-bit motion object X position field (MOXPOS) 190 and a 9-bit motion object Y position field (MOYPOS) 192 specify the position of the center of mass of the motion object. A 14-bit motion object size field (MOSIZE) 194 specifies the size or scale of the motion object. The motion object size 194 is a range of fixed point values from 1/1024 to 3 1023/1024 wherein the decimal is between bits 11 (B11) and 12 (B12). Lastly, an 8-bit motion object priority field (MOPRI) 196 specifies the video priority of the motion object with respect to the other motion objects. Video priority provides a way of handling a third dimension in that objects may overlie one another on the two-dimensional video display 127 (FIG. 3). Thus, if two or more objects happen to share a common pixel, then the pixel is given the color code associated with the object having the highest priority. A motion priority of 255 is the highest priority and a motion priority of 1 is the lowest. A motion priority of 0 indicates that the object should not be displayed.

Referring back to FIG. 4, the function of the microcode stored in the microcode ROM 156 can now be described. Each video frame, after the microprocessor 118 restarts the bit slice processor 146, the processor 146 writes motion objects into an empty frame buffer 166. Before actually writing out each motion object, the motion object specifiers 182 are copied into a different section of the parameter RAM 140 called the "hardware copy". The specifiers in the hardware copy are stored in the parameter RAM 140 in a sorted order according to a linked list based on the MOPRI 196 of each specifier 182. Motion objects with the MOPRI 196 set to 0 are not included in the linked list.

For each motion object, the bit slice processor 146 reads all six motion object parameters in the motion object specifier 182 from the parameter RAM 140 and, thereafter, reads the picture header parameters (not shown) from the RLE graphics ROM 150. The MOCOL 188 and the HFL 186 are fed to the line fill state machine 154 for later use. The X offset (XOFFSET) and Y offset (YOFFSET) from the picture header parameters are multiplied by the MOSIZE 194 to find the scaled pixel offsets. Later, the first pixel of the motion object will be drawn at [MOXPOS-(XOFFSET*MOSIZE), MOYPOS-(YOFFSET*MOSIZE)] as is shown in equations (1) and (2) above.

The bit slice processor 146 can then follow one of two control paths, one for growth, i.e., MOSIZE>=1.000, and one for shrink, i.e., MOSIZE<1.000. For growth objects, the scale factor, 1/MOSIZE, is found using a look-up table stored in the parameter RAM 140, which is pre-loaded by the microprocessor 118 (FIG. 3). The calculated scale factor is fed to a rate multiplier (to be described) that the line fill state machine 154 uses during pixel writing. For shrink objects, the MOSIZE 194 is fed directly to the rate multiplier in the line fill state machine 154.

A number of steps carried out by the bit slice processor 146 are common to the growth and shrink operations of the present invention. The address of RLE transition segments 176, and the number of transitions 174 in the first scan line are fed to the line fill state machine 154. The scan line number and first pixel address are fed to the XY address counter 162. If the scan line is visible, i.e., the motion object is inside the outline of the video display 127, the bit slice processor 146 commands the line fill state machine 154 to fill the scan line. After waiting for the state machine 154 to complete the filling of the raster line (i.e., the scanning signal goes inactive), the bit slice processor 154 updates the XY address counter 162 with the scan line number and the address of the next RLE transition segment 176. If the number of transition segments 174 is not exhausted then the common steps are repeated; otherwise the parameters for the next motion object are fetched.

FIG. 7 is a detailed block diagram of the line fill state machine (blitter) 154 of the present invention. Note that in order to simplify the figure, only one frame buffer 166 is shown receiving an address directly from the XY address counter 162. As was previously discussed with respect to FIG. 3, a transition segment 176 from the RLE graphics ROM 150 comprising a pixel length and a color code is loaded into the line fill state machine 154. A color code register 202 thus receives a load control from the control decoder 160 after each transition segment 176 is fetched. The color code is then written into one of the frame buffers 166 at the address specified by the XY address counter 162. The pixel length of the transition segment 176 is fed into a format translator 204 that translates the length according to parameter header information (not shown) and then writes a translated length into a length counter 206. The length counter 206 also receives a load control signal from the control decoder 160.

At the beginning of each raster scan line, a transition counter 208 is loaded by the bit slice processor 146 with the number of transition segments 174 that will be read from the RLE graphics ROM 150. The transition counter 208 receives a load control signal via the control decoder 160. A scale register 210 receives the scale factor as either calculated by the bit slice processor 146 or directly loaded from the parameter RAM 140.

A controller 212 controls the operation of the line fill state machine 154. The controller 212 receives a start signal from the control decoder 160 and generates a scanning signal while a raster scan line is in progress. The controller 212 receives a zero count signal from the length counter after a transition segment 176 is completely processed, and a zero signal from the transition counter 208 after a scan line is complete.

A rate multiplier 214 receives the contents of the scale register 210 and takes one of two actions. If the scale factor relates to a shrink operation, then the rate multiplier 214 selectively disables the XY address counter 162. In this way, the same color code is written to the same XY address more than one time while the length counter 206 is decremented for each write operation. On the other hand, if the scale factor relates to a growth operation, then the rate multiplier 214 selectively disables the length counter 206. In this way, the color code of the RLE transition segment is written to more and more XY addresses as the scale increases. The growth and shrink operations of the present invention are better understood by now referring to the examples shown in FIGS. 8 and 9.

Figure 8A:
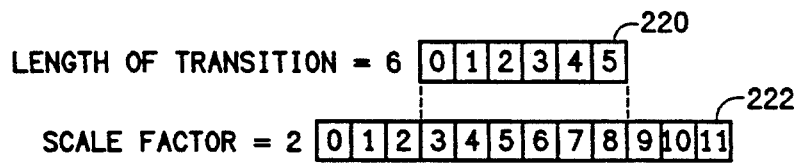
FIG. 8a is a diagram of pixels and their relative locations before and after the growth operation in the horizontal dimension according to the present invention.

In FIG. 8a, a transition segment 220 is shown to comprise six pixels. After a scale factor of 2 has been applied to the transition segment 220, a scaled transition segment 222 results having pixels 3-8 aligned with the positions of pixels 0-5 of the original transition segment 220. Thus, the transition segment 220 has grown around a center of mass defined between pixels 2 and 3.

Figure 8B:
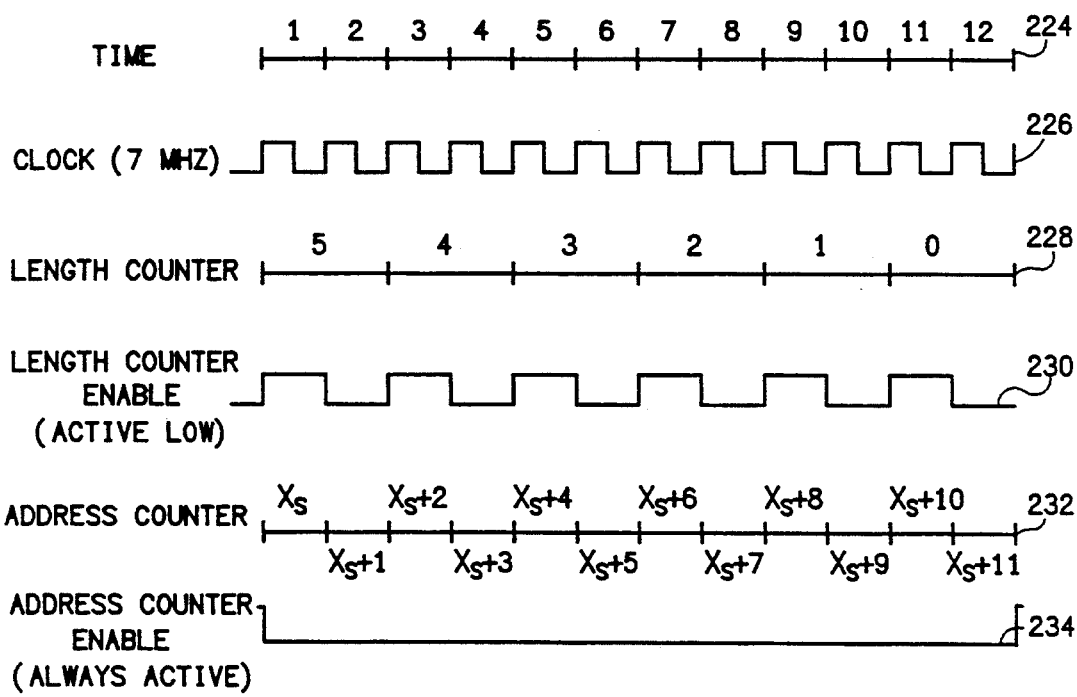

FIG. 8b is a timing diagram showing the function of the line fill state machine 154 (FIG. 7) during the growth operation described in FIG. 8a. A series of twelve clock cycles is illustrated by a timeline 224. The presently preferred clock frequency of 7 MHz is illustrated by a clock signal 226. The contents of the length counter 206 (FIG. 7) remains the same over two clock cycles, and then the contents of the length counter 206 is decremented, as illustrated in FIG. 8b by a length count 228. The length counter 206 is thus disabled for one clock cycle by the rate multiplier 214 of FIG. 7 as shown by a length counter enable 230. Meanwhile, the XY address counter 162 (FIG. 7) is loaded with a start address $X_s$ and then increments every clock cycle until reaching $X_s+11$ as shown by an address counter contents 232. Thus, an address counter enable 234 is made always active by the rate multiplier 214.

Figure 9A:
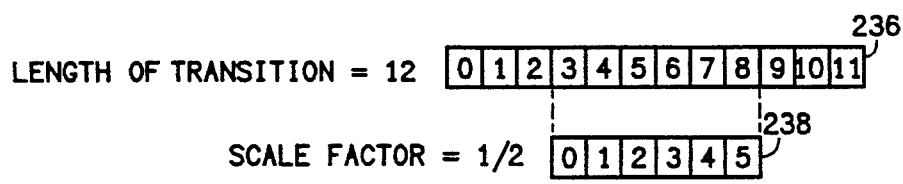
FIG. 9a is a diagram of pixels and their relative locations before and after the shrink operation in the horizontal dimension according to the present invention.

In FIG. 9a, a transition segment 236 is shown to comprise twelve pixels. After a scale factor of ½ has been applied to the transition segment 236, a scaled transition segment 238 results having pixels 0-5 aligned with the positions of pixels 3-8 of the original transition segment 236. Thus, the transition segment 236 has shrunk around a center of mass defined between pixels 5 and 6.

Figure 9B:
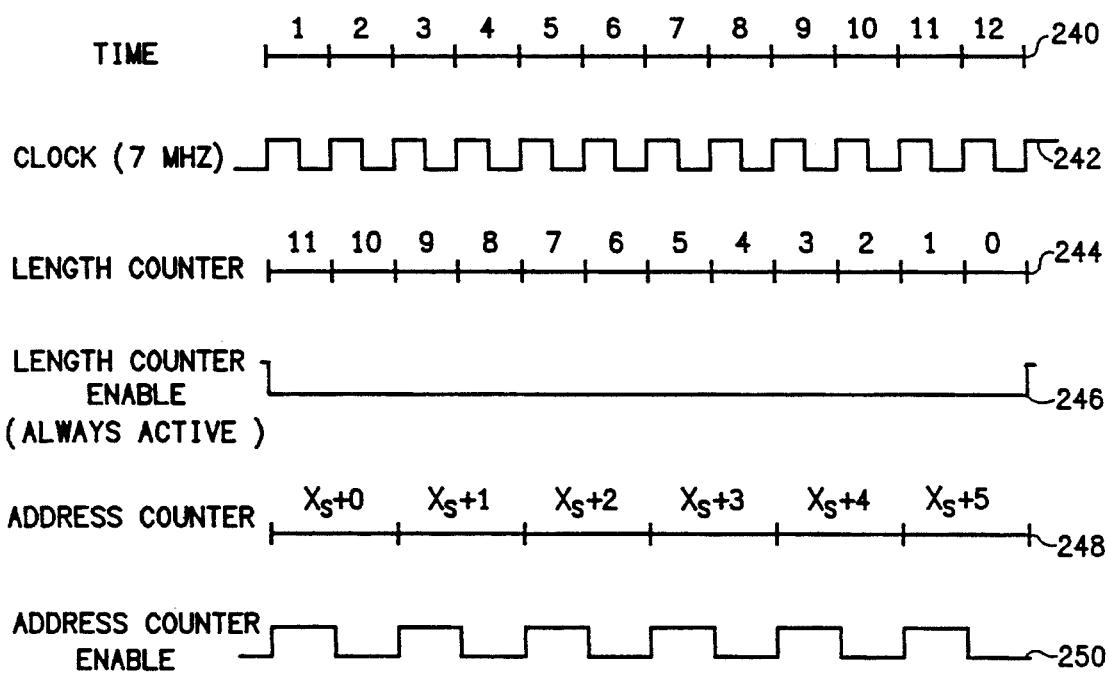

FIG. 9b is a timing diagram showing the function of the line fill state machine 154 (FIG. 7) during the shrink operation described in FIG. 9a. A series of twelve clock cycles is marked by a timeline 240. The presently preferred clock frequency of 7 MHz is illustrated by a clock signal 242. The contents of the length counter 206 (FIG. 7) is decremented every clock cycle as illustrated in FIG. 9b by a length count 244. The length counter 206 is thus always enabled by the rate multiplier 214 of FIG. 7 as shown by a length counter enable 246. Meanwhile, the XY address counter 162 (FIG. 7) is loaded with a start address $X_s$ and is then incremented every two clock cycles until reaching $X_s+5$ as shown by an address counter contents 248. Thus, an address counter enable 250 is selectively disabled by the rate multiplier 214 during the shrink operation.

Thus, it will be appreciated that the objects in a raster image can be scaled (reduced/enlarged) in real-time by the present invention. The scaling is accomplished using compressed graphics data (to conserve memory) and processing that is asynchronous to the vertical/horizontal sync of the raster scan signal used by a video display (increasing the flexibility and number of objects that can be processed). In addition, the growth and shrink operations performed according to the present invention are referenced about a predefined center of mass.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A scaling processor, comprising:
   a graphics memory storing a plurality of digital pictures, each of the digital pictures comprising a plurality of run length encoded (RLE) transition segments, each RLE transition segment, having a length and a color code, indicative of color pixels in at least a portion of a raster scan line;
   a parameter memory storing a plurality of motion object specifiers, each of the specifiers referring to a selected one of the digital pictures in the graphics memory and having a scale factor, and wherein a center of mass for the selected digital picture is predefined as an ordered set of offset Cartesian coordinates, ($X_{offset}$, $Y_{offset}$), the $X_{offset}$ coordinate defined as the horizontal offset and the $Y_{offset}$ defined as the vertical offset, the origin for the coordinates defined as a corner of the selected digital picture;
   a processor selecting one of the motion object specifiers in the parameter memory and selecting one of the RLE transition segments of the referenced digital picture in the graphics memory;
   a frame buffer; and
   a line fill state machine receiving the scale factor in the selected motion object specifier and receiving the selected RLE transition segment, wherein the length in the RLE transition segment is decremented while the color code in the RLE transition segment is written into the frame buffer at increasing addresses, the scale factor indicative of a growth or shrink operation thereby determinative of whether the decrementing of the length or the increasing of addresses is
   selectively disabled.

2. The scaling processor as defined in claim 1, wherein the processor is a bit slice processor.

3. The scaling processor as defined in claim 1, wherein the line fill state machine includes a length counter to store the length in the selected RLE transition segment.

4. The scaling processor as defined in claim 1, wherein the line fill state machine includes a scale register to store the scale factor in the selected object specifier.

5. The scaling processor as defined in claim 1, wherein the frame buffer is addressed by an address counter.

6. The scaling processor as defined in claim 1, wherein the line fill state machine includes a rate multiplier to selectively disable the decrementing of the length and increasing of addresses.

7. The scaling processor as defined in claim 1, additionally comprising a video display receivably connected to the frame buffer for displaying raster objects.

8. The scaling processor as defined in claim 7, wherein the frame buffer includes a double buffered frame buffer so that one frame buffer receives color codes from the line fill state machine and the other frame buffer outputs color codes to the video display.

9. An image scaling system, comprising:
   a compressed image memory storing a set of object images in a compressed format including transition segments having length and color information;
   a parameter memory storing an object specifier having an index of a selected one of the object images, a center of scaling for the selected object image, and a scale factor;

a frame buffer storing color information belonging to a scaled object;

a video display receiving pixel data indicative of the scaled object; and a blitter receiving a selected transition segment of the selected object image indexed in the object specifier and receiving the scale factor, the blitter having a rate multiplier to selectively disable the writing of color information to multiple locations in the frame buffer so as to produce an object image that is reduced in scale.

10. The image scaling system defined in claim 9, wherein the center of scaling for the selected object image is predefined as an ordered set of Cartesian coordinates ($X_{offset}$, $Y_{offset}$) with respect to a selected origin, the $X_{offset}$ coordinate defined as the horizontal offset and the $Y_{offset}$ coordinate defined as the vertical offset.

11. An image scaling system, comprising:

a compressed image memory storing a set of object images in a compressed format including transition segments having length and color information;

a parameter memory storing an object specifier having an index of a selected one of the object images, a center of scaling for the selected object image, and a scale factor;

a frame buffer storing color information belonging to a scaled object;

a video display receiving pixel data indicative of the scaled object; and a blitter receiving a selected transition segment of the selected object image indexed in the object specifier and receiving the scale factor, the blitter having a rate multiplier to selectively disable the decrementing of the length information in the transition segment thereby writing the same color information to multiple locations in the frame buffer so as to produce an object image that is increased in scale.

12. The image scaling system defined in claim 11, wherein the center of scaling for the selected object image is predefined as an ordered set of Cartesian coordinates ($X_{offset}$, $Y_{offset}$) with respect to a selected origin, the $X_{offset}$ coordinate defined as the horizontal offset and the $Y_{offset}$ coordinate defined as the vertical offset.

13. A method of scaling an object precompressed into a plurality of run length encoded segments and displayed by a computer having a processor, a memory and a video display, the object prestored in the memory of the computer, the method comprising the steps of:

retrieving from the memory a selected transition segment having a length and color code indicative of at least a portion of a raster scan line;

calculating a center of mass for the object;

retrieving from the memory a scale factor; and selectively processing the length and address of the memory using the scale factor so as to display pixels associated with the color code on the video display, thereby resulting in the display of the object scaled about the center of mass.

14. The method defined in claim 13, wherein the step of selective processing includes disabling processing the length resulting in object enlargement.

15. The method defined in claim 13, wherein the step of selective processing includes disabling processing the address of the memory resulting in object reduction.

16. The method of scaling as defined in claim 13, wherein following the step of calculating the center of mass, the method further comprises the steps of:

storing the center of mass for the object in the memory; and retrieving the center of mass for the object from the memory.

17. The method of scaling as defined in claim 11, wherein the center of mass is calculated using an ordered set of offset Cartesian coordinates ($X_{offset}$, $Y_{offset}$) with respect to a selected origin, the $X_{offset}$ coordinate defined as the horizontal offset and the $Y_{offset}$ coordinate defined as the vertical offset.

18. A system for scaling raster images, comprising:

a memory having a plurality of prestored raster pictures, the memory also having a predefined center of mass for each picture, wherein the center of mass for each picture is predefined as a set of offset Cartesian coordinates, ($X_{offset}$, $Y_{offset}$) with respect to a selected origin, the $X_{offset}$ coordinate defined as the horizontal offset and the $Y_{offset}$ coordinate defined as the vertical offset;

processing means for generating a set of parameters which define an initial position and a scale of a selected one of the prestored raster pictures; and scaling means responsive to the processing means for scaling the selected picture into an object about a reference point, the start position of the object calculated as an offset from the initial position which corresponds to the center of mass of the selected raster picture; and a video display for displaying the object.

19. A system for scaling raster images, comprising:

a memory having a plurality of prestored raster pictures, the memory also having a predefined center of mass for each picture;

processing means for generating a set of parameters which define an initial position and a scale of a selected one of the prestored raster pictures; and scaling means responsive to the processing means for scaling the selected picture into an object about a reference point, the start position of the object calculated as an offset from the initial position which corresponds to the center of mass of the selected raster picture; and a video display for displaying the object, wherein the start position is calculated according to the following equations:

$$X_s = X_i - \text{SCALE} \times X_{offset} \quad (1)$$

$$Y_s = Y_i - \text{SCALE} \times Y_{offset} \quad (2)$$

where:

$X_s$ is the starting X coordinate to draw the object;

$Y_s$ is the starting Y coordinate to draw the object;

$X_i$ is the displayable X coordinate of the object's center of mass;

$Y_i$ is the displayable Y coordinate of the object's center of mass;

SCALE is the scaling factor for reduction/enlargement;

$X_{offset}$ is the horizontal offset of the object origin from the center of mass; and $Y_{offset}$ is the vertical offset of the object origin from the center of mass.

* * * * *